US012018628B2

(12) United States Patent
Kohn et al.

(10) Patent No.: US 12,018,628 B2
(45) Date of Patent: Jun. 25, 2024

(54) TURBOJET ENGINE REAR PART COMPRISING A NOZZLE HAVING FLAPS COMPRISING LEVERS THAT ARE MOVABLE BY MEANS OF UPSTREAM AND DOWNSTREAM BEARING WALLS

(71) Applicant: SAFRAN AIRCRAFT ENGINES, Paris (FR)

(72) Inventors: Thierry Kohn, Moissy-Cramayel (FR); Frédéric Paul Eichstadt, Moissy-Cramayel (FR); Elric Georges André Fremont, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/252,079

(22) PCT Filed: Nov. 5, 2021

(86) PCT No.: PCT/FR2021/051957
§ 371 (c)(1),
(2) Date: May 8, 2023

(87) PCT Pub. No.: WO2022/096837
PCT Pub. Date: May 12, 2022

(65) Prior Publication Data
US 2024/0003316 A1 Jan. 4, 2024

(30) Foreign Application Priority Data
Nov. 9, 2020 (FR) ...................................... 2011435

(51) Int. Cl.
*F02K 1/12* (2006.01)
*F02K 1/06* (2006.01)

(52) U.S. Cl.
CPC .............. *F02K 1/1223* (2013.01); *F02K 1/06* (2013.01); *F05D 2250/37* (2013.01); *F05D 2250/90* (2013.01); *F05D 2260/50* (2013.01)

(58) Field of Classification Search
CPC ............. F02K 1/06; F02K 1/12; F02K 1/1223
See application file for complete search history.

(56) References Cited

U.S. PATENT DOCUMENTS 2,989,845 A * 6/1961 Howald ................ F02K 1/1223
239/455
2,995,010 A * 8/1961 Arscott ................. F02K 1/1223
239/455

(Continued)

FOREIGN PATENT DOCUMENTS

| FR | 2180440 A1 | 11/1973 |
| FR | 2714421 A1 | 6/1995 |
| GB | 1418077 A | 12/1975 |

OTHER PUBLICATIONS

International Search Report for issued in Application No. PCT/FR2021/051957 dated Jan. 26, 2022.

(Continued)

*Primary Examiner* — William H Rodriguez
(74) *Attorney, Agent, or Firm* — PEARNE & GORDON LLP

(57) ABSTRACT

A rear part for a turbojet engine includes a variable-geometry nozzle in which a convergent flap is provided with a lever supporting a bearing roller arranged axially between an upstream bearing wall and a downstream bearing wall, which are rigidly secured to a movable part capable of moving axially on command with respect to an upstream stator structure in such a way that the bearing roller is free to move with respect to the upstream and downstream bearing walls in a radial direction. During a downstream movement of the movable part, the upstream bearing wall (Continued)

pushes the lever to pivot a downstream end of the convergent flap towards the longitudinal axis. Operation of the drive mechanism for moving the movable part can thus be optimized while limiting the size and the mass of the mechanism for controlling the flaps.

8 Claims, 5 Drawing Sheets

(56) References Cited

U.S. PATENT DOCUMENTS

| | | | | |
|---|---|---|---|---|
| 3,807,637 | A * | 4/1974 | Camboulives | F02K 1/1223 239/265.41 |
| 3,873,027 | A * | 3/1975 | Camboulives | F02K 1/1223 239/265.41 |
| 4,245,787 | A * | 1/1981 | Freid | F02K 1/1269 239/265.41 |
| 5,120,005 | A * | 6/1992 | Reedy | F02K 1/1292 239/265.41 |
| 5,176,323 | A * | 1/1993 | Nash | F02K 1/15 239/265.41 |
| 2005/0161527 | A1* | 7/2005 | Murphy | F02K 1/1223 239/128 |
| 2007/0062199 | A1* | 3/2007 | Cowan | F02K 1/1223 60/770 |
| 2015/0292437 | A1* | 10/2015 | Luong | F02K 1/805 29/889.22 |
| 2019/0345894 | A1* | 11/2019 | Slaney | F01D 9/04 |

OTHER PUBLICATIONS

Written Opinion for PCT/FR2021/051957 dated Jan. 26, 2022.
Search Report issued in French Patent Application No. 2011435 dated Sep. 9, 2021.

* cited by examiner

TURBOJET ENGINE REAR PART COMPRISING A NOZZLE HAVING FLAPS COMPRISING LEVERS THAT ARE MOVABLE BY MEANS OF UPSTREAM AND DOWNSTREAM BEARING WALLS

This is the National Stage of PCT international application PCT/FR2021/051957, filed on Nov. 5, 2021 entitled "JET ENGINE REAR PART COMPRISING A NOZZLE HAVING FLAPS COMPRISING LEVERS THAT ARE MOVABLE BY MEANS OF UPSTREAM AND DOWNSTREAM BEARING WALLS", which claims the priority of French Patent Application No. 2011435 filed Nov. 9, 2020, both of which are incorporated herein by reference in their entireties.

TECHNICAL FIELD

The present invention relates to the field of variable-geometry nozzles of the turbojet engines intended for the propulsion of the aircraft.

STATE OF THE PRIOR ART

The turbojet engines intended for supersonic flight generally comprise a post-combustion channel whose outlet is delimited by a variable-geometry axisymmetric nozzle, that is to say capable of adapting its geometry to the different speeds at which such an aircraft is likely to fly.

To this end, such a nozzle comprises at least one set of movable inner flaps, called convergent flaps, distributed about the longitudinal axis of the turbojet engine and each having an upstream end hinged on an inner structure of the casing, each of the convergent flaps comprising a panel intended to channel the exhaust air flow within the nozzle. Such a nozzle further comprises a system for controlling the convergent flap capable of causing the latter to pivot about their hinge axes at the casing in a synchronised manner.

Very often, the nozzles intended for supersonic flight further comprise another set of movable inner flaps, called divergent flaps, distributed about the longitudinal axis, each comprising a panel intended to channel the exhaust air flow within the nozzle, and having respective upstream ends hinged on downstream ends of the convergent flaps, whereby such a nozzle is called convergent-divergent nozzle. In this case, the control system is further configured to servo-control the positions of the divergent flaps to those of the convergent flaps. Such a system thus allows continuously varying the respective inclinations of the convergent flaps relative to the longitudinal axis of the turbojet engine, and corresponding inclinations of the divergent flaps thereto, relative to this axis, according to a determined unambiguous law. Such a nozzle thus allows in particular varying the position and the shape of the throat of the nozzle.

It should be noted that the qualifier "divergent" does not exclude that the concerned flaps can adopt orientations parallel to the longitudinal axis or even convergent in certain operating phases. Similarly, particularly in the case of nozzles not including divergent flaps, it is possible for the convergent flaps to adopt orientations parallel to the longitudinal axis or even divergent in certain operating phases.

In this context, there is a need for a variable-geometry nozzle whose system for controlling the movable inner flaps is effective and space-saving in the radial direction in order to allow its integration into a limit space.

DISCLOSURE OF THE INVENTION

The invention aims in particular at meeting this need in a simple, economical and effective manner.

It proposes, to this end, a turbojet engine rear part, comprising:
  an upstream stator structure;
    a variable-geometry nozzle comprising a set of convergent flaps distributed about a longitudinal axis of the turbojet engine rear part, each comprising a panel intended to channel an exhaust air flow within the nozzle, and each having an upstream end hinged on the upstream stator structure along a corresponding first hinge axis; wherein at least some of the convergent flaps, called controlled convergent flaps, each comprise a lever which is rigidly secured to the corresponding panel and extending in a direction away from the longitudinal axis, said lever carrying a bearing roller mounted freely rotatable on the lever along an axis parallel to the corresponding first hinge axis; and
  drive means comprising a movable part capable of moving axially on command relative to the upstream stator structure, The bearing roller of the lever of at least one of the controlled convergent flaps is disposed axially between an upstream bearing wall and a downstream bearing wall which are rigidly secured to the movable part of the drive means, such that the bearing roller of the lever is free to move relative to the upstream and downstream bearing walls at least in a radial direction relative to the longitudinal axis.

Thus, during a downstream movement of the movable part of the drive means, the upstream bearing wall pushes the lever downstream and thus causes the convergent flap to pivot along the corresponding first hinge axis, leading to bring a downstream end of the convergent flap closer to the longitudinal axis.

In addition, during an upstream movement of the movable part of the drive means, at least if the turbojet engine is stopped, the downstream bearing wall pushes the lever upstream and thus causes the convergent flap to pivot along to corresponding first hinge axis, leading to move the downstream end of the convergent flap away from the longitudinal axis.

Therefore, the drive means can be exploited in an optimal manner during a manoeuvre to increase the convergence of the convergent flaps of the nozzle. In addition, the means implemented for controlling the flaps can thus have a size and a mass which are limited at best.

In embodiments of the invention, one of the upstream and downstream bearing walls is connected to the movable part of the drive means via the other of the upstream and downstream bearing walls.

In embodiments of the invention, an outer connecting wall interconnects respective radially outer ends of the upstream and downstream bearing walls.

In embodiments of the invention, the upstream bearing wall disposed opposite to the bearing roller of each lever is spaced circumferentially from upstream bearing walls disposed opposite to the bearing rollers of the two closest levers, and the downstream bearing wall disposed opposite to the bearing roller of each lever is circumferentially spaced from downstream bearing walls disposed opposite to the bearing roller of the two closest levers, whereby the upstream and downstream bearing walls form an annular row of bearing devices each comprising one of the upstream bearing walls and one of the downstream bearing walls.

In embodiments of the invention, the turbojet engine rear part, comprises a synchronisation ring surrounding the set of convergent flaps or the upstream stator structure, and by which each of the bearing devices is connected to the movable part of the drive means.

In embodiments of the invention, for each bearing device, a first connecting lateral wall interconnects respective first circumferential ends of the upstream and downstream bearing walls, and a second connecting lateral wall interconnects respective second circumferential ends of the upstream and downstream bearing walls, opposite to the first circumferential ends.

In embodiments of the invention, the variable-geometry nozzle further comprises a set of divergent flaps distributed about the longitudinal axis, comprising panels intended to channel the exhaust air flow within the nozzle, and having upstream ends hinged on downstream ends of the convergent flaps, whereby the nozzle is a convergent-divergent nozzle.

The turbojet engine for an aircraft, comprising a rear part of the type described above.

BRIEF DESCRIPTION OF DRAWINGS

The invention will be better understood, and other details, advantages and features thereof will appear on reading the following description given by way of non-limiting example and with reference to the appended drawings in which.

In all these figures, identical references can designate identical or similar elements.

DETAILED DISCLOSURE OF PREFERRED EMBODIMENTS

Figure 1:
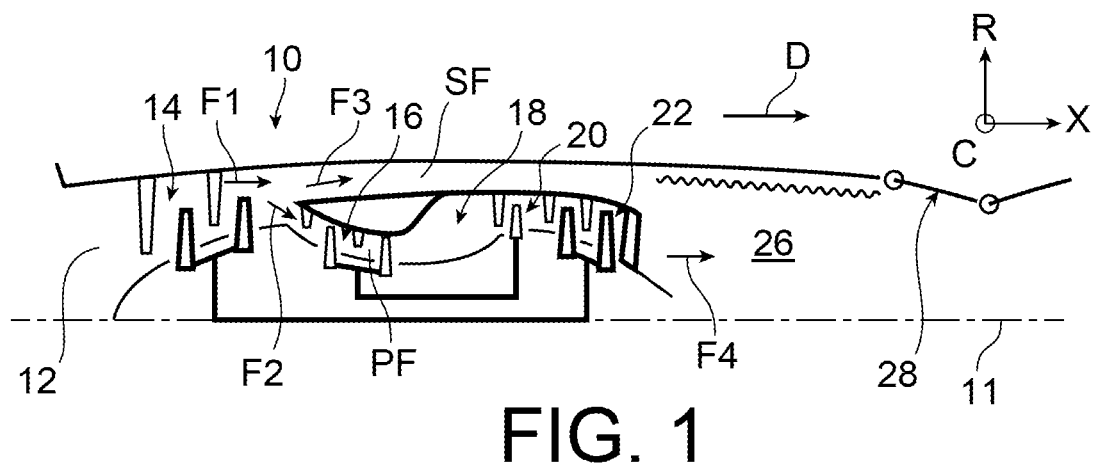
FIG. 1 is a schematic half-view in axial section of a turbojet engine comprising a variable-geometry nozzle.

FIG. 1 illustrates a turbojet engine 10, for example a twin-spool and bypass turbojet engine, intended for the propulsion of an aircraft capable of supersonic flight, and therefore intended in particular to be installed in the fuselage of such an aircraft. The invention is of course applicable to other types of turbojet engines.

Throughout this description, the axial direction X is the direction of the longitudinal axis 11 of the turbojet engine. Unless otherwise stated, the radial direction R is at all points a direction orthogonal to the longitudinal axis 11 and passing through the latter, and the circumferential direction C is at all points a direction orthogonal to the radial direction R and to the longitudinal axis 11. Unless otherwise stated, the terms "inner" and "outer" respectively refer to a relative proximity, and a relative remoteness, of an element relative to the longitudinal axis 11. Finally, the qualifiers "upstream" and "downstream" are defined with reference to a general direction D of the flow of gases in the turbojet engine 10.

By way of illustration, such a turbojet engine 10 comprises, from upstream to downstream, an air inlet 12, a low-pressure compressor 14, a high-pressure compressor 16, a combustion chamber 18, a high-pressure turbine 20, a low-pressure turbine 22, a post-combustion channel 26, and a variable-geometry nozzle 28, for example of the convergent-divergent type. These members of the turbojet engine are all centred along the longitudinal axis 11 of the turbojet engine.

In a well-known manner, the high-pressure compressor 16, the combustion chamber 18, and the high-pressure 20 and low-pressure 22 turbines define a primary flow path PF. The latter is surrounded by a secondary flow path SF of the turbomachine which extends from upstream to downstream from an outlet of the low-pressure compressor. Thus, in operation, the air F1 which has entered through the air inlet 12 and which has been compressed by the low-pressure compressor 14, is then divided into a primary flow F2 which circulates in the primary flow path and into a secondary flow F3 which circulates in the secondary flow path. The primary flow F2 is then further compressed in the high-pressure compressor 16, then mixed with fuel and ignited in the combustion chamber 18, before undergoing expansion in the high-pressure turbine 20 then in the low-pressure turbine 22.

The exhaust gas flow F4, consisting of the mixture of the combustion gases, from the primary flow path, and the secondary flow F3, then circulates in the post-combustion channel 26, then escapes from the turbojet engine 10 through the nozzle 28.

In operating mode with post-combustion, for example to propel an aircraft at supersonic speeds, fuel is mixed with the exhaust gas flow F4 within the post-combustion channel 26, and the mixture thus formed is ignited within this post-combustion channel, in order to generate an additional thrust.

Figure 2:
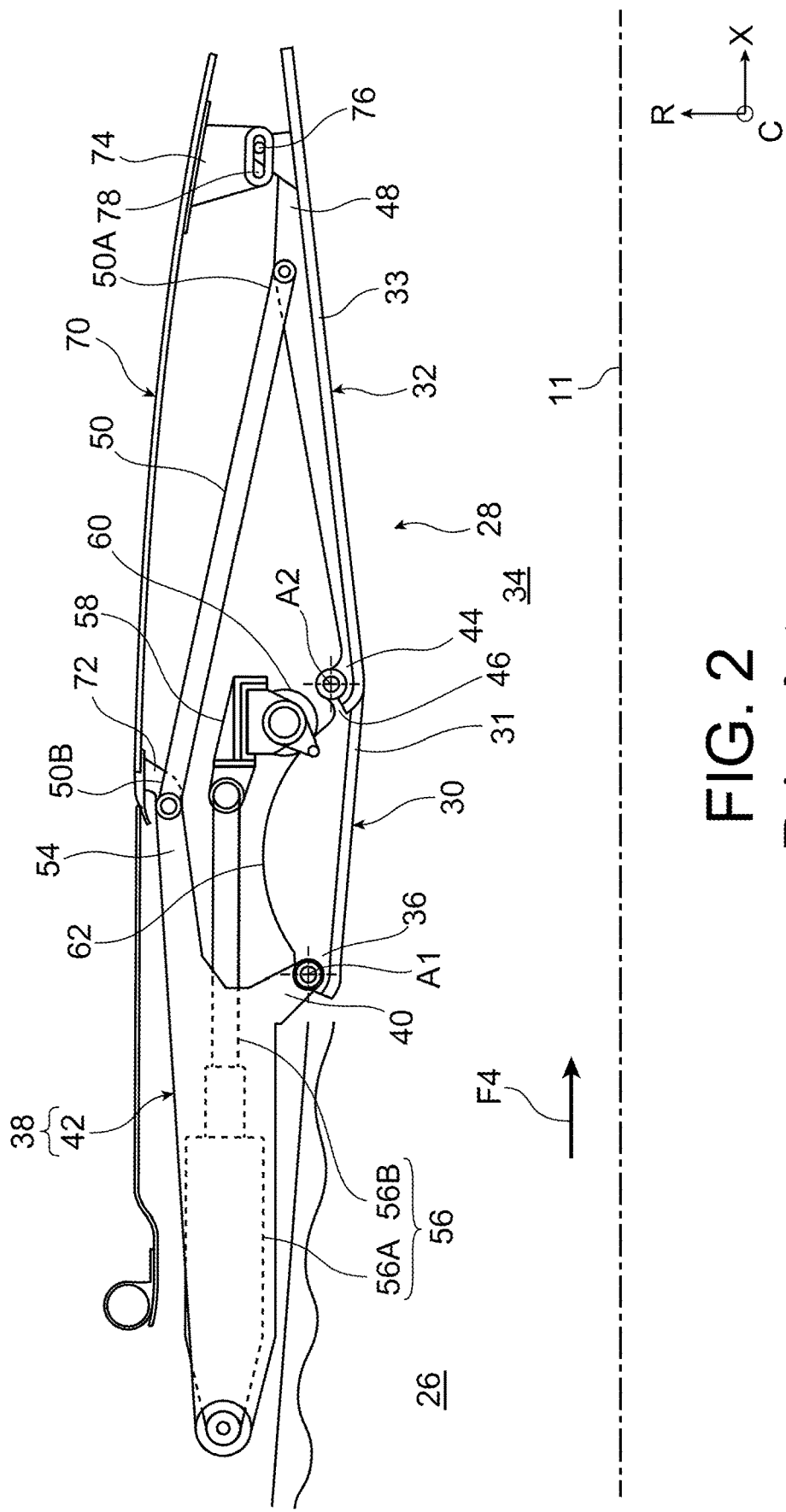
FIG. 2 is a schematic half view in axial section of a rear part of a known type turbojet engine.
Figure 3:
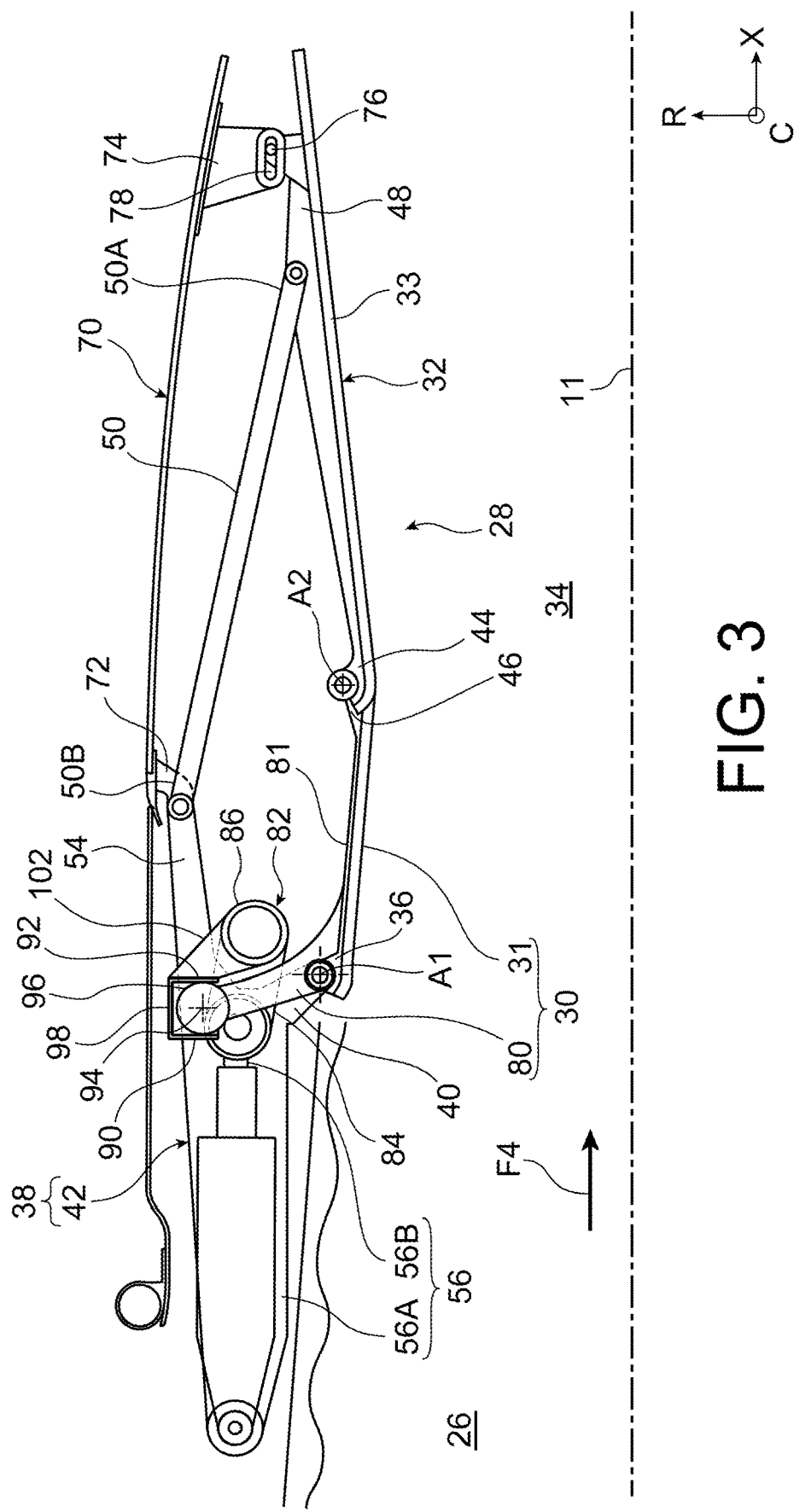
FIG. 3 is a schematic half-view in axial section of a rear part of the turbojet engine of FIG. 1, according to an embodiment of the invention.

FIG. 2 illustrates on a larger scale a turbojet engine rear part in a configuration known from the prior art, and allows in particular seeing the movable inner flaps of the nozzle.

The movable inner flaps consist, upstream, of a set of convergent flaps distributed about the longitudinal axis 11, and, downstream, of a set of divergent flaps 32 also distributed about the longitudinal axis 11.

These movable inner flaps each include a panel 31, 33 contributing to externally delimiting an exhaust gas circulation channel 34 defined in the extension of the post-combustion channel 26. The movable inner flaps 30, 32 thus allow channeling the exhaust gas flow F4 at the outlet of the turbojet engine 10, in operation.

The convergent flaps 30 are hinged at their upstream ends 36 on a stator structure 38 of the turbojet engine rear part, in this case on inner yokes 40 of beams 42 belonging to said stator structure, such that the convergent flaps 30 are capable of moving in rotation about first hinge axes A1 secured to the stator structure 38.

The divergent flaps 32 are hinged, at the upstream ends 44 thereof, on downstream ends 46 of the convergent flaps 30, such that the divergent flaps 32 are capable of moving in rotation about second hinge axes A2 secured to the convergent flaps 30. The divergent flaps 32 are further hinged, at the downstream ends 48 thereof, on first ends 50A of connecting rods 50 having opposite second ends 50B which are hinged on the stator structure 38, in this case on outer yokes 54 of the beams 42.

A system for controlling movable inner flaps includes drive means configured to act on at least some of the convergent flaps, which will be referred to as controlled convergent flaps in what follows. In the case where other convergent flaps are subject to the action of the drive means only via the controlled convergent flaps, these other convergent flaps are referred to as follower convergent flaps, in a well-known manner.

The drive means typically consist of cylinders 56 each having a static part, for example their body 56A, fastened to the stator structure 38, and a movable part, for example their rod 56B, secured to a corresponding roller support 58, on which is mounted a roller 60 in rolling bearing contact with a cam 62 formed by a structure 64 secured to the panel 31 of a corresponding convergent flap, the roller support 58 being further secured to a retaining finger 66 cooperating with the structure 64 to radially retain the convergent flap 30 and in particular prevent the flap from lowering under the effect of gravity when the turbojet engine is stopped. The set of movable inner flaps 30 and 32 thus forms, with the stator structure 38, an isostatic system.

A translational movement of the movable part of each cylinder 56 thus allows causing the convergent flaps 30 to move in rotation about the first hinge axes A1, which is accompanied by a rotational movement of the divergent flaps 32 about the second hinge axes A2. Such displacements of the movable inner flaps 30, 32 result in modifying the profile of the nozzle and in particular the section of the throat thereof at the junction between the convergent flaps and the divergent flaps.

The nozzle further includes movable outer flaps 70 having upstream ends 72 hinged on the stator structure 38, for example on the outer yokes 54 of the beams 42, and downstream ends 74 secured to the downstream ends 48 of the divergent flaps 32, for example by means of roller 76 and slide 78 connecting devices.

The variable-geometry configuration of the nozzle 28 allows adapting the latter to the different phases of flight. Thus, in subsonic mode, the converging inner flaps 15 are for example maintained in a weakly convergent configuration, while in supersonic mode, the converging inner flaps adopt a more convergent configuration.

A drawback of the control systems of the type described above is that the cylinders 56 work in the direction of the retraction of their rod 56B, which is the direction of the least effective work, during a manoeuvre to increase the convergence of the convergent flaps, whereas this type of manoeuvre is the one that requires the most significant force.

Other known control systems do not include a roller or a cam, but a chain of elements hinged to each other. In these systems, the part of the cylinders linked to the stator structure is hinged to the latter about orthoradial (that is to say tangential) axes. Therefore, a drawback of such control systems lies in the relatively significant size of these systems in the radial direction.

The turbojet engine rear part of FIG. 1, according to one embodiment of the invention, will now be described in more detail with reference to FIGS. 3 to 6.

The controlled convergent flaps 30 each comprise a lever 80 which is secured to the panel 31 of the flap. Such a lever 80 naturally extends in a direction away from the longitudinal axis 11, from the panel 31 or, in the illustrated example, from a stiffening structure 81 arranged on the outer face of the panel 31 and secured to the latter.

Analogously to what is described above, the turbojet engine rear part comprises drive means comprising a movable part capable of moving axially on command relative to the upstream stator structure 38. By way of illustration, the drive means are, here again, consisting of cylinders 56, and the set of the rods 56B of the cylinders constitute said movable part.

In order to allow the movable part of the drive means to act on the lever 80 of at least one of the controlled convergent flaps 30, said lever 80 is disposed axially between an upstream bearing wall 90 and a downstream bearing wall 92, which are rigidly secured to the movable part of the drive means, such that the lever 80 is free to move relative to the upstream 90 and downstream 92 bearing walls at least in the radial direction R relative to the longitudinal axis 11.

In this manner, during a downstream movement of the movable part of the drive means (consisting of rods 56B), the upstream bearing wall 90 pushes the lever downstream and thus causes the convergent flap 30 to pivot along the corresponding first hinge axis A1, leading to bring a downstream end 46 of the flap closer to the longitudinal axis 11.

Conversely, during an upstream movement of the moving part of the drive means, at least if the turbojet engine is stopped, the downstream bearing wall 92 pushes the lever 80 upstream and thus causes the convergent flap 30 to pivot along the corresponding first hinge axis A1, leading to move the downstream end 46 of the flap away from the longitudinal axis 11. If the turbojet engine is in operation, it is possible that the thrust of the gases on the convergent flap 30 is sufficient to cause the latter to pivot even before the downstream bearing wall 92 comes into contact with the lever 80. Therefore, it is advantageously provided that the upstream bearing wall 90 has an increased rigidity compared to the downstream bearing wall 92. To this end, the upstream bearing wall 90 can be thicker than the downstream bearing wall 92, or the upstream bearing wall 90 can have stiffening ribs, the downstream bearing wall 92 may not have such stiffening ribs.

The lever 80 is provided with a bearing roller 96 of cylindrical shape of revolution, mounted freely rotatable on the lever 80 along an axis 94 parallel to the corresponding first hinge axis A1, arranged between the upstream 90 and downstream 92 bearing walls, such that any contact of any one of the upstream 90 and downstream 92 bearing walls on the lever 80 is a cylinder/planar contact.

Thus, during a pivoting manoeuvre of the convergent flap under the effect of a thrust force applied to the bearing roller 96 by one of the upstream 90 and downstream 92 bearing walls, the radial movement of the bearing roller 96 relative to the concerned bearing wall is performed by means of rolling of the bearing roller 96 on said bearing wall.

The axial spacing between the upstream 90 and downstream 92 bearing walls is greater than the diameter of the bearing roller 96, such that an axial clearance permanently exists between the bearing roller 96 and the bearing wall which is opposite to the bearing wall exerting the thrust on the bearing roller 96.

The bearing roller 96 is advantageously arranged at a free end of the lever 80, so as to maximise the lever arm exerted by the upstream 90 and downstream 92 bearing walls on the concerned convergent flap 30.

Figure 5:
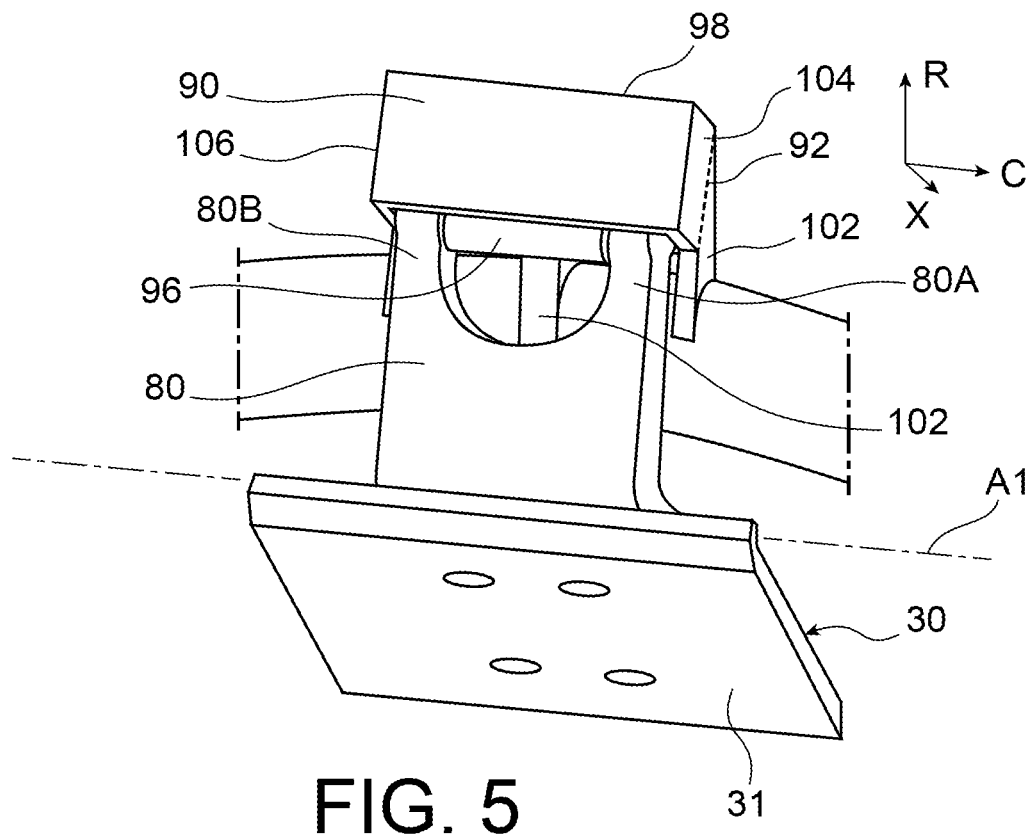
FIGS. 5 and 6 are schematic perspective views on a larger scale of a part of the elements visible in FIG. 4.
Figure 6:
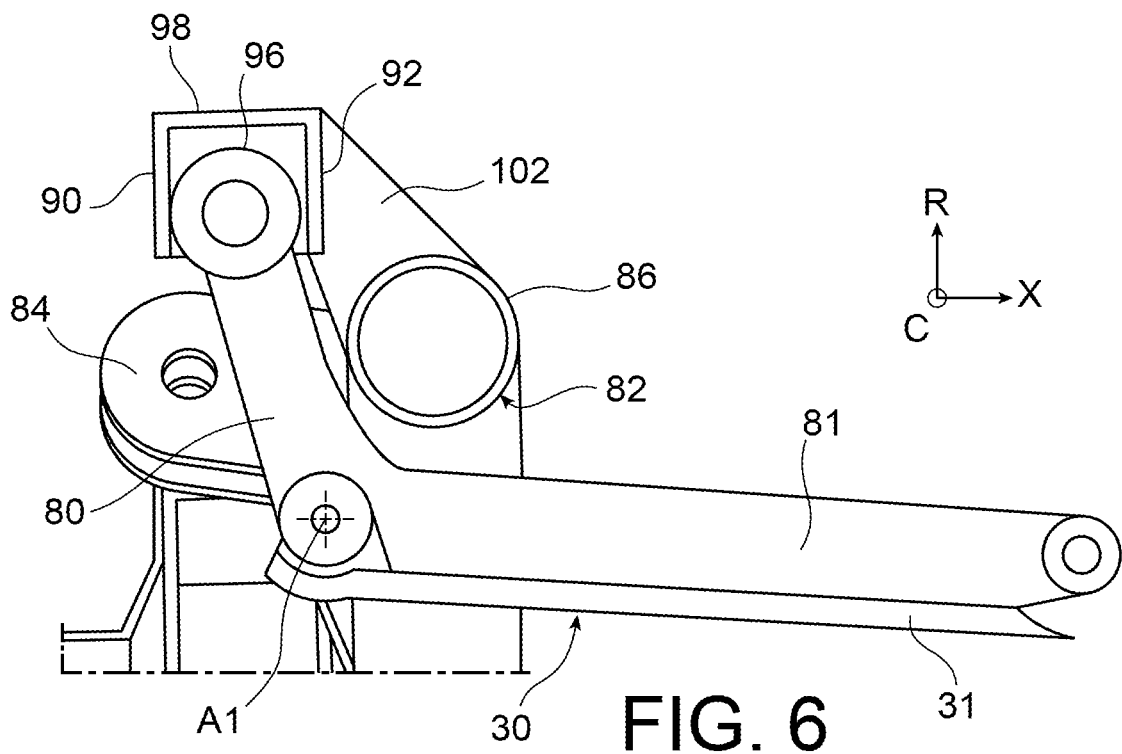

Thus, the bearing roller 96 is for example mounted on an axis carried by two lateral arms 804, 80B forming an end fork of the lever 80 (FIG. 5).

Moreover, one of the bearing walls, in this case the downstream bearing wall 92, is connected to the movable part of the drive means via the other of the bearing walls, in this case the upstream bearing wall 90.

To this end, an outer connecting wall 98 interconnects respective radially outer ends of the upstream 90 and downstream 92 bearing walls (FIGS. 3 to 6).

The preceding description, concerning the manoeuvre of the lever of one of the controlled convergent flaps, is preferably also valid for the other controlled convergent flaps.

Figure 4:
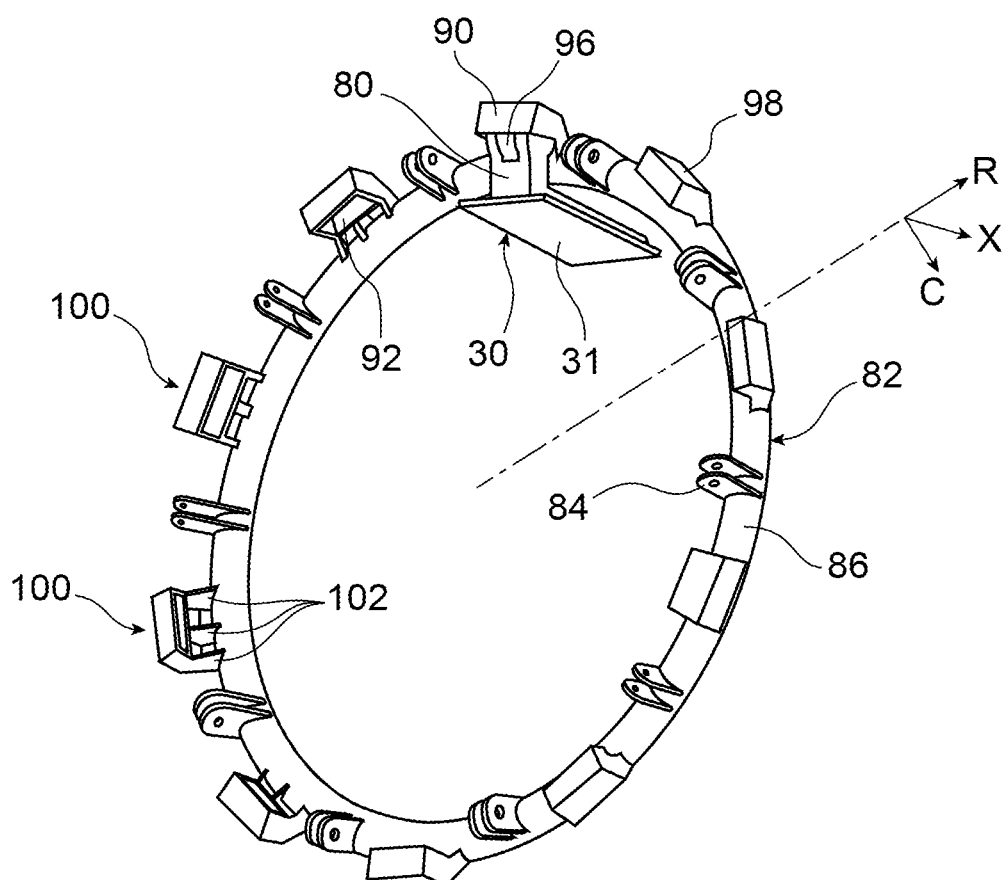
FIG. 4 is a schematic perspective view of certain elements composing the rear part of the turbojet engine of FIG. 1.

Thus, in the illustrated embodiment, the upstream bearing wall 90 disposed opposite to each lever 80 is circumferentially spaced from upstream bearing walls disposed opposite to the two levers 80 which are closest to the considered lever, and the downstream bearing wall 92 disposed opposite to each lever 80 is circumferentially spaced from the downstream bearing walls 92 disposed opposite to the two levers 80 which are closest to the lever considered (FIG. 4). The upstream 90 and downstream 92 bearing walls thus form an annular row of bearing devices 100 which are spaced apart from each other, each bearing device 100 comprising a corresponding pair of bearing walls comprising one of the upstream bearing walls 90 and one of the downstream bearing walls 92.

The illustrated turbojet engine rear part further comprises a synchronisation ring 82 arranged around the set of convergent flaps 30 or, alternatively, arranged a little more upstream around the upstream stator structure 38, and through which each of the bearing devices 100 is connected to the movable part of the drive means, that is to say to the set of rods 56B of the cylinders 56.

In particular, the movable part of the drive means is connected to the synchronisation ring 82 so as to be able to move the latter in translation along the longitudinal axis 11. To this end, the rods 56B of the cylinders 56 are hinged to first yokes 84 of the synchronisation ring 82. Such first yokes 84 are formed protruding from a main body 86, for example of toroidal shape, of the synchronisation ring 82. The first yokes 84 extend for example upstream from the main body 86.

It should be noted that the main body 86 of the synchronisation ring may have a more complex shape, including for example an alternation of parts protruding radially inwards and parts protruding radially outwards and/or an alternation of upstream protruding parts and downstream protruding parts. In all cases, the main body 86 of the synchronisation ring extends all around the longitudinal axis 11 of the turbojet engine and thus has a generally annular shape.

Each of the support devices 100 is connected to the synchronisation ring 82, for example by means of three arms 102 circumferentially spaced from each other and each connecting the synchronisation ring 82 to the downstream bearing wall 92 (FIG. 4).

Alternatively, the control of the convergent flaps 30 can be ensured directly by the movable part of the drive means, for example by the rods 56B of the cylinders, without using a synchronisation ring.

In the example illustrated, within each bearing device 100, one of which is visible in FIG. 5, a first connecting lateral wall 104 interconnects respective first circumferential ends of the upstream 90 and downstream 92 bearing walls, and a second connecting lateral wall 106 interconnects respective second circumferential ends of the upstream 90 and downstream 92 bearing walls, opposite to the first circumferential ends. The first and second connecting lateral walls 104, 106 thus allow connecting the upstream bearing wall 90 to the downstream bearing wall 92 and therefore to the synchronisation ring 82, and via the latter, to the movable part of the drive means.

In such a case, the outer connecting wall 98 can of course be omitted.

In operation, a deployment of the rod 56B of each cylinder 56, or more generally a deployment downstream of the movable part of the drive means, causes the synchronisation ring 82 to move downstream, which drives downstream each upstream 90 and downstream 92 bearing wall. Each upstream bearing wall 90 is thus brought into contact with the bearing roller 96 of the corresponding lever 80. Each upstream bearing wall 90 then pushes the bearing roller 96, and therefore the lever 80, downstream, and causes the corresponding flap to pivot in the direction of the longitudinal axis 11, which increases the convergence of the convergent flaps 30. The bearing roller 96 rolls on the upstream bearing wall 90 during the pivoting of the flap, such a rolling being allowed due to the clearance existing between the roller 96 and the other bearing wall, in this case the downstream bearing wall 92.

Conversely, a retraction of the rod 56B of each cylinder 56, or more generally a retraction upstream of the moving part of the drive means, causes the synchronisation ring 82 to move upstream, which drives upstream each upstream and downstream 92 bearing wall. If the turbojet engine is stopped, each downstream bearing wall 92 is thus brought into contact with the bearing roller 96 of the corresponding lever 80. Each downstream bearing wall 92 then pushes the bearing roller 96, and therefore the lever 80, upstream, and causes the corresponding flap to pivot in the direction opposite to the longitudinal axis 11, which reduces the convergence of the convergent flaps 30. The bearing roller 96 rolls on the downstream bearing wall 92 during the pivoting of the flap, such a rolling being here again allowed due to the clearance existing between the roller 96 and the other bearing wall, in this case the upstream bearing wall 90. However, if the turbojet engine is in operation, it is possible that the thrust of the gases on the convergent flap 30 is sufficient to cause the pivoting of the latter even before the downstream bearing wall 92 comes into contact with the lever 80.

The cylinders 56 thus work in the direction of the deployment of their rod 56B during a manoeuvre to increase the convergence of the convergent flaps, which is advantageous from the mechanical point of view. Indeed, at least in the preferred case in which the cylinders 56 are hydraulic cylinders, the deployment of the rod of such a cylinder results from a hydraulic pressure exerted on the entire surface of the piston of the cylinder, while the retraction of the rod results from a hydraulic pressure exerted on the surface of the piston reduced by the section of the rod. For this reason at least, the deployment of the rod generally offers an increased power relative to the retraction of the rod.

In addition, all elements participating in the control of the inner flaps, consisting of the levers 80, the upstream 90 and downstream 92 bearing walls, and the means connecting the latter to the movable part of the drive means, can thus have limited size and mass.

Moreover, the lever 80 of each of the controlled convergent flaps 30 is advantageously arranged at an upstream end 30A of the flap, so as to again limit as much as possible the size and mass of the system for controlling the flap.

In such a case, it is advantageous for the synchronisation ring 82 to be disposed downstream of the lever 80 of each of the controlled convergent flaps 30.

It should be noted that the bodies 56A of the cylinders 56 can be rigidly fastened to the stator structure 38, in the same manner as in the known example illustrated in FIG. 2 and described above.

In alternative embodiments, the upstream bearing walls 90 can be connected to each other so as to constitute a unitary upstream bearing structure extending over 360 degrees. Similarly, the downstream bearing walls 92 can be connected to each other so as to constitute a unitary downstream bearing structure extending over 360 degrees.

Such bearing structures can be directly integrated into the body 86 of the synchronisation ring 82.

What is claimed is:

1. A turbojet engine rear part, comprising:
   an upstream stator structure;
   a variable-geometry nozzle comprising a set of convergent flaps distributed about a longitudinal axis of the turbojet engine rear part, each comprising a panel intended to channel an exhaust gas flow within the nozzle, and each having an upstream end hinged on the upstream stator structure along a corresponding first hinge axis;
   wherein at least some of the convergent flaps, called controlled convergent flaps, each comprise a lever which is rigidly secured to the corresponding panel and extending in a direction away from the longitudinal axis, said lever carrying a bearing roller mounted freely rotatable on the lever along an axis parallel to the corresponding first hinge axis;
   drive means comprising a movable part capable of moving axially on command relative to the upstream stator structure,
   wherein the bearing roller of the lever of at least one of the controlled convergent flaps is disposed axially between an upstream bearing wall and a downstream bearing wall which are rigidly secured to the movable part of the drive means, such that the bearing roller of the lever is free to move relative to the upstream and downstream bearing walls at least in a radial direction relative to the longitudinal axis, whereby:
   during a downstream movement of the movable part of the drive means, the upstream bearing wall pushes the lever downstream and thus causes the convergent flap to pivot along the corresponding first hinge axis, leading to bring a downstream end of the convergent flap closer to the longitudinal axis, and
   during an upstream movement of the movable part of the drive means, at least if the turbojet engine is stopped, the downstream bearing wall pushes the lever upstream and thus causes the convergent flap to pivot along the corresponding first hinge axis, leading to move the downstream end of the convergent flap away from the longitudinal axis.

2. The turbojet engine rear part according to claim 1, wherein one of the upstream and downstream bearing walls is connected to the movable part of the drive means via the other of the upstream and downstream bearing walls.

3. The turbojet engine rear part according to claim 2, wherein an outer connecting wall interconnects respective radially outer ends of the upstream and downstream bearing walls.

4. The turbojet engine rear part according to claim 1, wherein the upstream bearing wall disposed opposite to the bearing roller of each lever is spaced circumferentially from upstream bearing walls disposed opposite to the bearing rollers of the two closest levers, and the downstream bearing wall disposed opposite to the bearing roller of each lever is circumferentially spaced from downstream bearing walls disposed opposite to the bearing roller of the two closest levers, whereby the upstream and downstream bearing walls form an annular row of bearing devices each comprising one of the upstream bearing walls and one of the downstream bearing walls.

5. The turbojet engine rear part according to claim 4, comprising a synchronisation ring surrounding the set of convergent flaps or the upstream stator structure, and by which each of the bearing devices is connected to the movable part of the drive means.

6. The turbojet engine rear part according to claim 4, wherein, for each bearing device, a first connecting lateral wall interconnects respective first circumferential ends of the upstream and downstream bearing walls, and a second connecting lateral wall interconnects respective second circumferential ends of the upstream and downstream bearing walls, opposite to the first circumferential ends.

7. The turbojet engine rear part according to claim 1, wherein the variable-geometry nozzle further comprises a set of divergent flaps distributed about the longitudinal axis, comprising panels intended to channel the exhaust gas flow within the nozzle, and having upstream ends hinged on downstream ends of the convergent flaps, whereby the nozzle is a convergent-divergent nozzle.

8. A turbojet engine for an aircraft, comprising a rear part according to claim 1.

* * * * *